(12) United States Patent
Thomas et al.

(10) Patent No.: US 7,222,823 B2
(45) Date of Patent: May 29, 2007

(54) PAYLOAD ADAPTER

(75) Inventors: Gareth Rhys Thomas, Del Mar, CA (US); Cynthia Marie Fadick, Encinitas, CA (US)

(73) Assignee: ATA Engineering, Inc., San Diego, CA (US)

( * ) Notice: Subject to any disclaimer, the term of this patent is extended or adjusted under 35 U.S.C. 154(b) by 107 days.

(21) Appl. No.: 10/886,214

(22) Filed: Jul. 6, 2004

(65) Prior Publication Data

US 2006/0016928 A1 Jan. 26, 2006

(51) Int. Cl.
*B64G 1/22* (2006.01)

(52) U.S. Cl. .............. 244/173.2; 248/636; 248/346.02

(58) Field of Classification Search ............. 244/173.2, 244/173.1; 248/678, 636, 638, 346.01, 346.02; 428/292

See application file for complete search history.

(56) References Cited

U.S. PATENT DOCUMENTS

| | | | | |
|---|---|---|---|---|
| 2,095,672 A * | 10/1937 | Miller | .................... | 248/346.01 |
| 2,210,102 A * | 8/1940 | Steudel | .................... | 248/346.01 |
| 4,150,588 A * | 4/1979 | Brewer | .................... | 464/180 |
| 4,789,118 A * | 12/1988 | Byers | .................... | 244/173.1 |
| 4,991,811 A * | 2/1991 | Portnoy | .................... | 248/346.01 |
| 5,280,889 A | 1/1994 | Amil et al. | | |
| 5,419,524 A * | 5/1995 | Evans et al. | ............. | 248/346.4 |
| 5,419,528 A * | 5/1995 | Carter et al. | ................ | 248/585 |
| 5,626,332 A | 5/1997 | Phillips et al. | | |
| 5,641,133 A | 6/1997 | Toossi | | |
| 5,645,103 A * | 7/1997 | Whittaker | .................... | 137/312 |
| 5,655,757 A * | 8/1997 | Starkovich et al. | .... | 267/140.15 |
| 5,816,554 A * | 10/1998 | McCracken | ............ | 248/346.01 |
| 5,848,767 A | 12/1998 | Cappa et al. | | |
| 5,929,395 A * | 7/1999 | Bizlewicz | .................... | 181/207 |
| 5,961,078 A | 10/1999 | Edberg et al. | | |
| 6,012,680 A * | 1/2000 | Edberg et al. | ........... | 244/173.2 |
| 6,045,112 A * | 4/2000 | Kirkwood | .................... | 248/634 |
| 6,053,454 A * | 4/2000 | Smolik et al. | ........... | 244/173.1 |
| 6,098,926 A | 8/2000 | Morgenthaler | | |
| 6,199,801 B1 | 3/2001 | Wilke et al. | | |
| 6,202,961 B1 | 3/2001 | Wilke et al. | | |
| 6,244,541 B1 | 6/2001 | Hubert | | |
| 6,290,183 B1 | 9/2001 | Johnson et al. | | |
| 6,305,871 B1 | 10/2001 | Lancho Doncel et al. | | |
| 6,345,788 B1 | 2/2002 | Shtarkman | | |
| 6,355,337 B1 * | 3/2002 | Piening et al. | ............... | 428/223 |
| 6,563,239 B1 * | 5/2003 | Baer et al. | ..................... | 310/51 |
| 6,609,681 B2 | 8/2003 | Buder | | |
| 6,745,987 B2 * | 6/2004 | Rousselet et al. | ........... | 248/363 |
| 6,824,863 B1 * | 11/2004 | Kitayama et al. | ........ | 428/299.7 |

* cited by examiner

*Primary Examiner*—Timothy D. Collins
(74) *Attorney, Agent, or Firm*—Ingrassia Fisher & Lorenz, P.C.

(57) ABSTRACT

A payload adapter consists of a body that when hollow includes a plurality of stiffeners—radial and/or circumferential—or alternatively a core for carrying shear loads. The body may include a first annular face sheet, a second annular face sheet and a plurality of stiffeners connecting between the first annular face sheet and the second annular face sheet. The combination of the annular hollow body and the plurality of stiffeners or the same face sheets combined with an in-filled core results in an axial frequency and a lateral (pitch) frequency for the payload adapter that provides superior vibration isolation. Constrained layer damping is incorporated into the design for additional vibration attenuation.

37 Claims, 16 Drawing Sheets

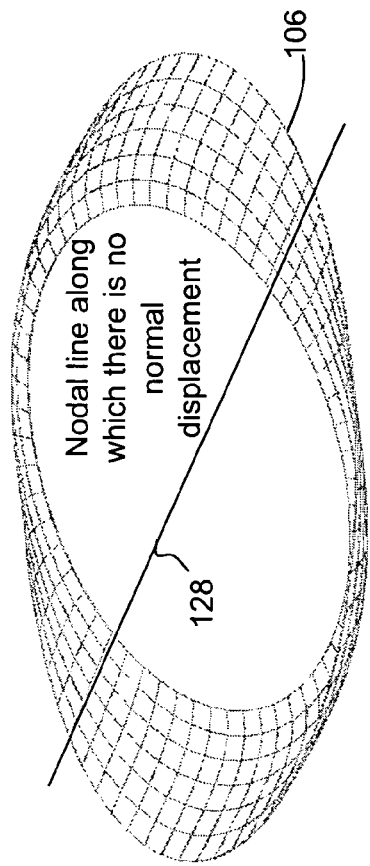
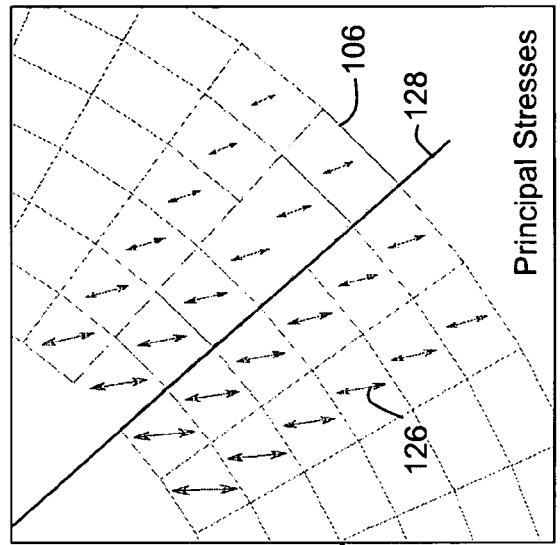
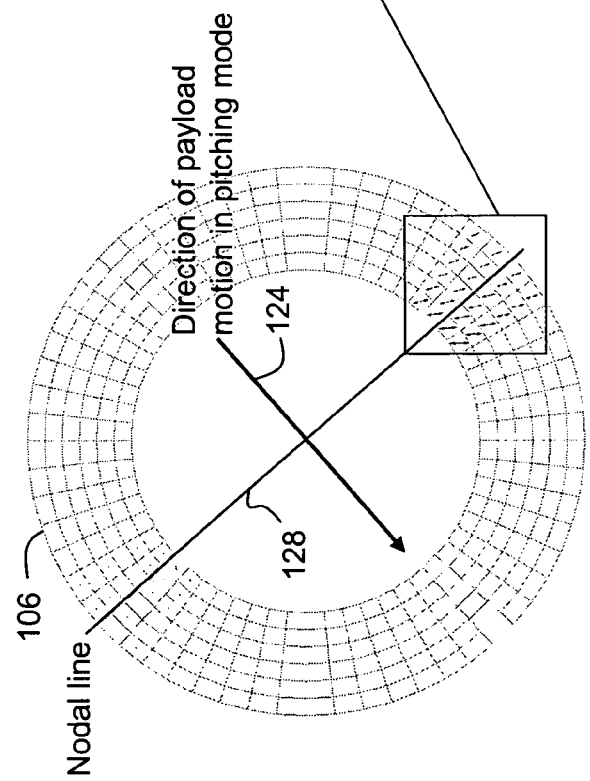

Figure 12 Arrows indicate directions for which there is no stiffness contributed by the fibers shown, either for +/-45° or other symmetric fiber orientations

PAYLOAD ADAPTER

STATEMENT REGARDING FEDERALLY SPONSORED RESEARCH OR DEVELOPMENT

This invention was made with United States Government support under contract F29601-02-C-0096 awarded by AFRL/PK8VV. The U.S. Government has certain rights in this invention.

FIELD OF THE INVENTION

The present invention relates generally to a payload adapter. More particularly, the present invention relates to a payload adapter that provides a convenient and integral mounting system to reduce the payload axial and lateral vibrations by keeping the associated natural frequencies as low as possible without affecting the launch vehicle controllability adversely.

BACKGROUND OF THE INVENTION

Payloads, such as satellites or spacecraft, which are mounted on launch vehicles, are subject to severe vibrations during flight. These vibrations are induced by multiple sources from liftoff to the instant of final separation from the launch vehicle. The dynamic mechanisms include ignition and operation of the rocket engines, transient vectoring forces at the nozzles, separation of rocket stages, aerodynamic effects and acoustic phenomena. The vibrations are often associated with severe quasi-static loads caused by axial thrust. The frequency content of the vibrations generally extends from 10-20 Hz to several kHz. The amplitude of the vibrations tends to be more severe in certain frequency bands and this is usually a function of the type of rocket motor being used. There is one class of commonly used solid rocket motors that generates high vibrations in the 50-60 Hz range.

A direct result of the severe vibrations generally experienced by payloads is that fatigue damage and failure can be incurred by sensitive payload components. Extensive engineering effort is normally expended to insure that this phenomenon is fully understood and avoided.

The mounting of the payload to the launch vehicle is usually done by attaching the lower spacecraft interface to the forward end of the rocket. Thus, the payload is normally cantilevered at the front of the launch vehicle. This configuration leads to axial components of the interface forces between the payload and vehicle even in the presence of purely lateral loads. These components are additive to those caused by the axial loads and vibrations. This observation underlines the importance of the axial load transfer at the interface and a great deal of attention has traditionally been given to this.

A rigid connection at the payload/vehicle interface has been widely used in the past, especially for vehicles with very robust payloads. In situations where a few sensitive components are to be used in the payload, these components are sometimes attached using individual vibration isolation mount systems. This approach is not cost or weight efficient for a fragile payload and the concept of complete payload isolation is now widely adopted in such situations.

Complete payload vibration isolation schemes generally use a flexible payload/vehicle interface. When the natural frequency of the payload vibrating on the flexibility of the interface is significantly lower than the frequency of the vibrations being transmitted through the vehicle to the interface, the payload is essentially isolated. The real challenge in the design of a satisfactory complete payload vibration isolation system is to satisfy two competing requirements. First, a payload mounting frequency low enough to achieve good isolation is required. Secondly, it is important to avoid the problematic interaction of the low frequency payload modes of vibration with the low frequency primary bending modes of the vehicle. The first requirement drives the payload frequency down while the second drives it up.

The difficulty of satisfying the two competing requirements is best understood with reference to specific example frequencies. In cases where it is desirable to isolate 55 Hz vibrations the axial payload mode must be less than 39 Hz to get any attenuation at all. A frequency of about 25 Hz would be desirable, as this would achieve a vibration transmissibility of only approximately 27%. The 25 Hz value is a lower bound of the acceptable frequency range because of interaction problems with rocket axial modes of vibration for a broad range of launch vehicle designs. Therefore, for these rockets, the payload isolation frequency in the axial mode of vibration should be in the 25-39 Hz range.

The lateral modes of vibration of the payload make the frequency requirements even more difficult to satisfy. Problematic interaction with bending modes of the rocket leads to a common requirement that the payload lateral mode of vibration should be greater than approximately 15 Hz. The lateral and axial modes of vibration of the payload are generally closely coupled for typical adapter designs. It is noted that if discrete springs are used to introduce flexibility into the payload mounting system it is difficult to avoid having the bounce mode higher than three times the lateral frequency. This ratio of three is applicable for geometries where the mounting circle has a diameter approximately equal to the height of the payload center of gravity above this circle. Thus, a 15 Hz lateral mode may well be associated with an axial frequency of 45 Hz which is clearly too high to achieve attenuation of the 50-60 Hz vibrations. These vibrations may well be amplified for such a system rendering the concept of discrete-spring vibration isolation infeasible for the frequencies cited.

A parameter that has significant bearing on the performance of a vibration isolation system is damping. Typically the higher the damping the greater is the vibration attenuation. It is therefore desirable to incorporate damping features into the design of an isolation system.

Accordingly, there is a need for payload mounting adapter that avoids the high axial-to-lateral frequency ratio inherent in the commonly used discrete spring isolation concepts, provides a convenient and integral mounting scheme without resorting to add-on devices such as springs or flexures, and leads to cost and weight savings.

SUMMARY OF THE INVENTION

A payload adapter configured in accordance with the invention achieves vibration isolation by minimizing the ratio of axial frequency to lateral frequency. The payload adapter can be designed in a manner that does not require a significant amount of customization related to the specific payload and/or launch vehicle specifications. In addition, the payload adapter need not employ add-on features, e.g., springs or other vibration damping elements.

The above and other aspects of the invention may be carried out in one form by a payload adapter comprising a hollow body and a plurality of radial ribs located within the body.

BRIEF DESCRIPTION OF THE DRAWINGS

In the following detailed description of the invention reference is made to the accompanying drawings which form a part hereof, and in which are shown, by way of illustration, specific embodiments in which the invention may be practiced. These embodiments are described in sufficient detail to enable those skilled in the art to practice the invention. Other embodiments may be utilized, and structural changes may be made, without departing from the scope of the present invention.

FIGS. 7a-7c are schematic representations of stresses in the top sheet for the pitch mode of vibration.

DETAILED DESCRIPTION OF A PREFERRED EMBODIMENT

Figure 1:
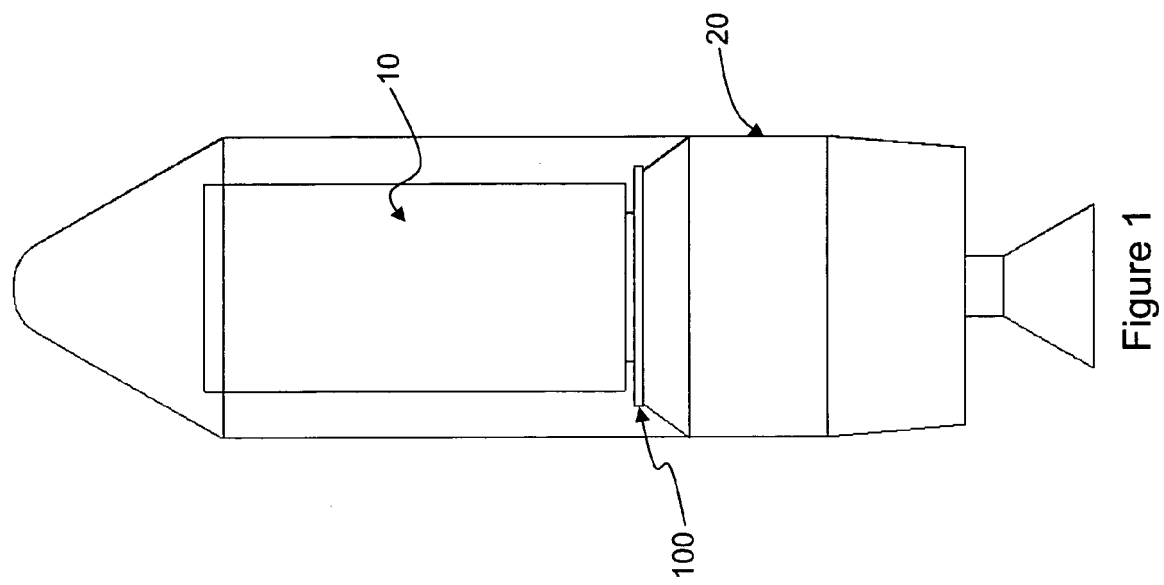
FIG. 1 is a schematic side view of a payload attached to a launch vehicle upper stage.

Embodiments of the invention will now be described with reference to the accompanying figures, wherein like reference numerals refer to like elements throughout. Unless otherwise expressly stated herein, the terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the words "a" or "an" are employed to describe elements and components of the invention. This is done merely for convenience and to give a general sense of the invention. This description should be read to include one or at least one and the singular also includes the plural unless it is obvious that it is meant otherwise.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Payloads 10, such as satellites or spacecraft, can be mounted on launch vehicle upper stages 20 as shown in FIG. 1. The payloads 10 are subject to severe vibrations during flight. These vibrations are induced by multiple sources from liftoff to final separation. The dynamic mechanisms include ignition and operation of the rocket engines, transient vectoring forces at the nozzles, separation of rocket stages, aerodynamic effects and acoustic phenomena. The vibrations are often associated with severe quasi-static loads caused by axial thrust. The frequency content of the vibrations generally extends from 10-20 Hz to several kHz. The amplitude of the vibrations tends to be more severe in certain frequency bands and this is often a function of the type of rocket motor being used. There is one class of commonly used solid rocket motors that generates high vibrations in the 50-60 Hz range.

Figure 2:
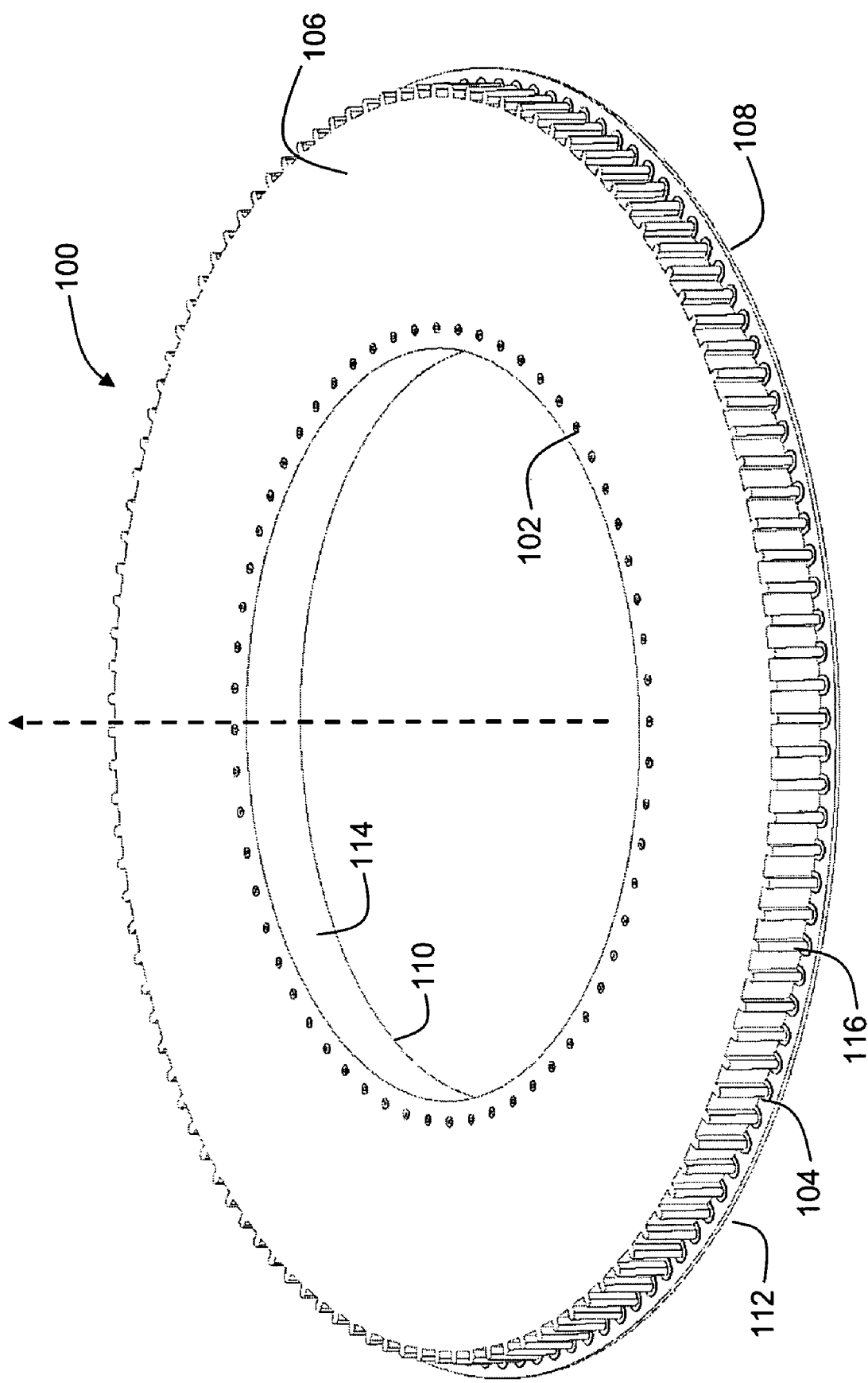
FIG. 2 is a perspective view of one embodiment of the payload adapter.

To protect the payload 10 from the vibrational loading environment, a payload adapter 100 may be utilized at the payload/vehicle interface. In one embodiment, shown in FIG. 2, the payload adapter 100 is a flat annular plate or disk that includes an inner bolt circle 102 and an outer bolt circle 104. The outer bolt circle 104 facilitates connection to a launch vehicle 20 by known attachment means. The inner bolt circle 102 facilitates connection to a payload 10. In other embodiments, the inner bolt circle 102 may be larger than the outer bolt circle or may be replaced by a configuration that can accommodate multiple payloads.

The special isolation characteristics of the payload adapter 100 are achieved by means of specific construction features. In one embodiment, the payload adapter 100 is a hollow body that includes a first face sheet 106 and a spaced apart second face sheet 108. In the embodiment shown the hollow body is an annular hollow body having an inner diameter 110 and an outer diameter 112. In other embodiments, the hollow body may be any shape. The only significant restriction on this shape is that the outer edge of the body must fall within the launch vehicle envelope. Thus an outer circular profile would seem preferred but other shapes such as regular or irregular polygons would be acceptable. In some embodiments, the first face sheet and the second face sheet are the same size and concentric. In other embodiments, the first and second face sheets may have different diameters and/or be non-concentric. In yet another embodiment, the inner diameter may not exist (i.e. no hole is present).

An inner closure ring 114 attaches the first face sheet 106 and the second face sheet 108 at the inner diameter 110 and an outer closure ring 116 attaches the first face sheet 106 and the second face sheet 108 at the outer diameter 112. The inner bolt circle 102 is proximate the inner closure ring 114 and the outer bolt circle 104 is proximate the outer closure ring 116. In some embodiments, the bolt circles may be incorporated in the closure rings. There is a broad list of options for the rings with the simplest consisting of a short axial piece cut from a composite cylinder. This would then be edge bonded to the face sheets. A more involved alternative would consist of structural section curved into a ring and trapped by the adjoining face sheets. A U, top-hat or rectangular sections would all be well suited for this type of construction.

Figure 10:
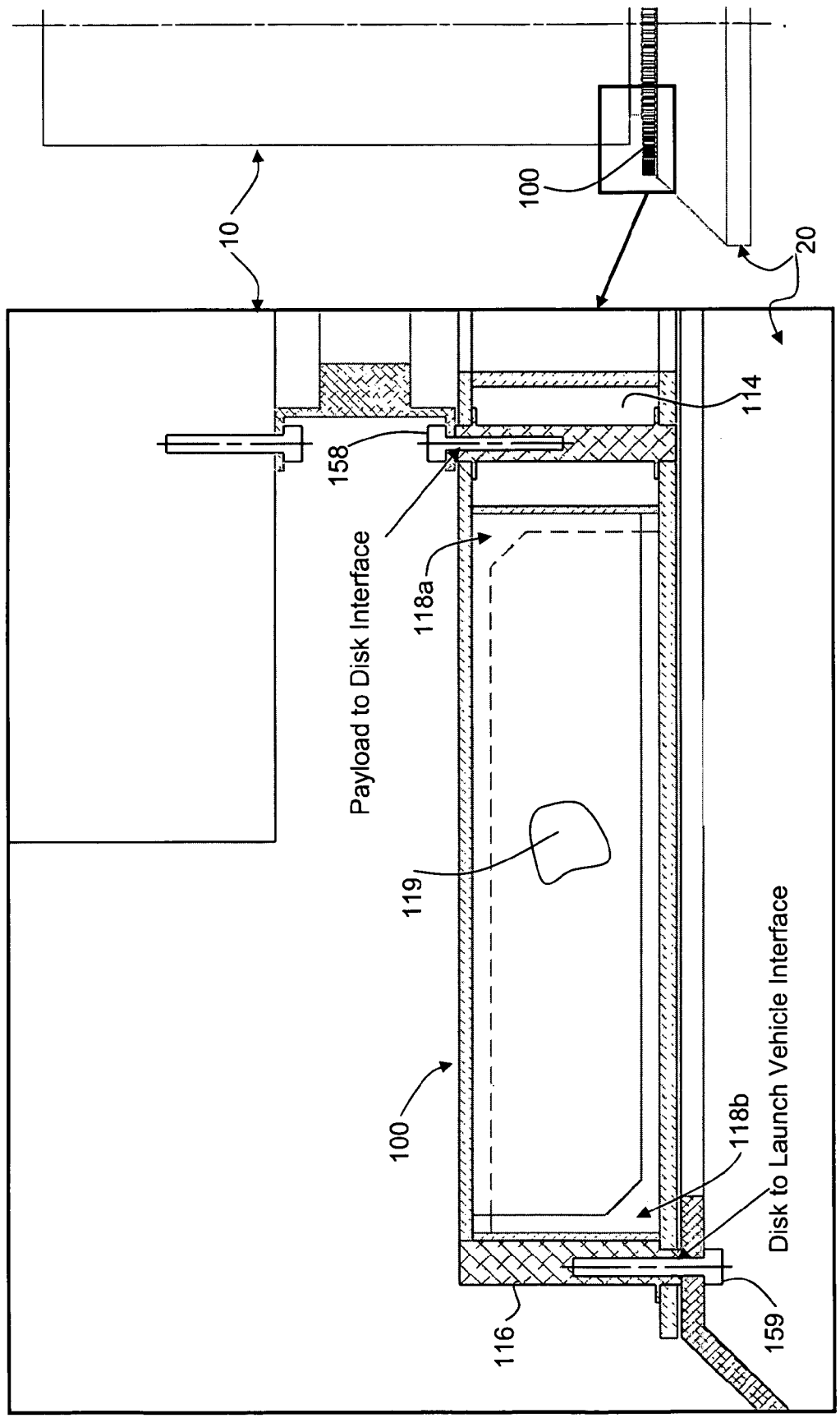
FIG. 10 is a sectional view showing one embodiment of attachment of a payload adaptor to a payload and a launch vehicle.

FIG. 10 shows one embodiment of a payload 10 attached to a launch vehicle 20 using a payload adapter 100. The payload 10 is attached to the payload adapter 100 at the inner bolt circle 102 with a plurality of attachment bolts 158. The payload 10 is attached to the launch vehicle 20 at the outer bolt circle with a plurality of attachment bolts 159.

Figure 3A:
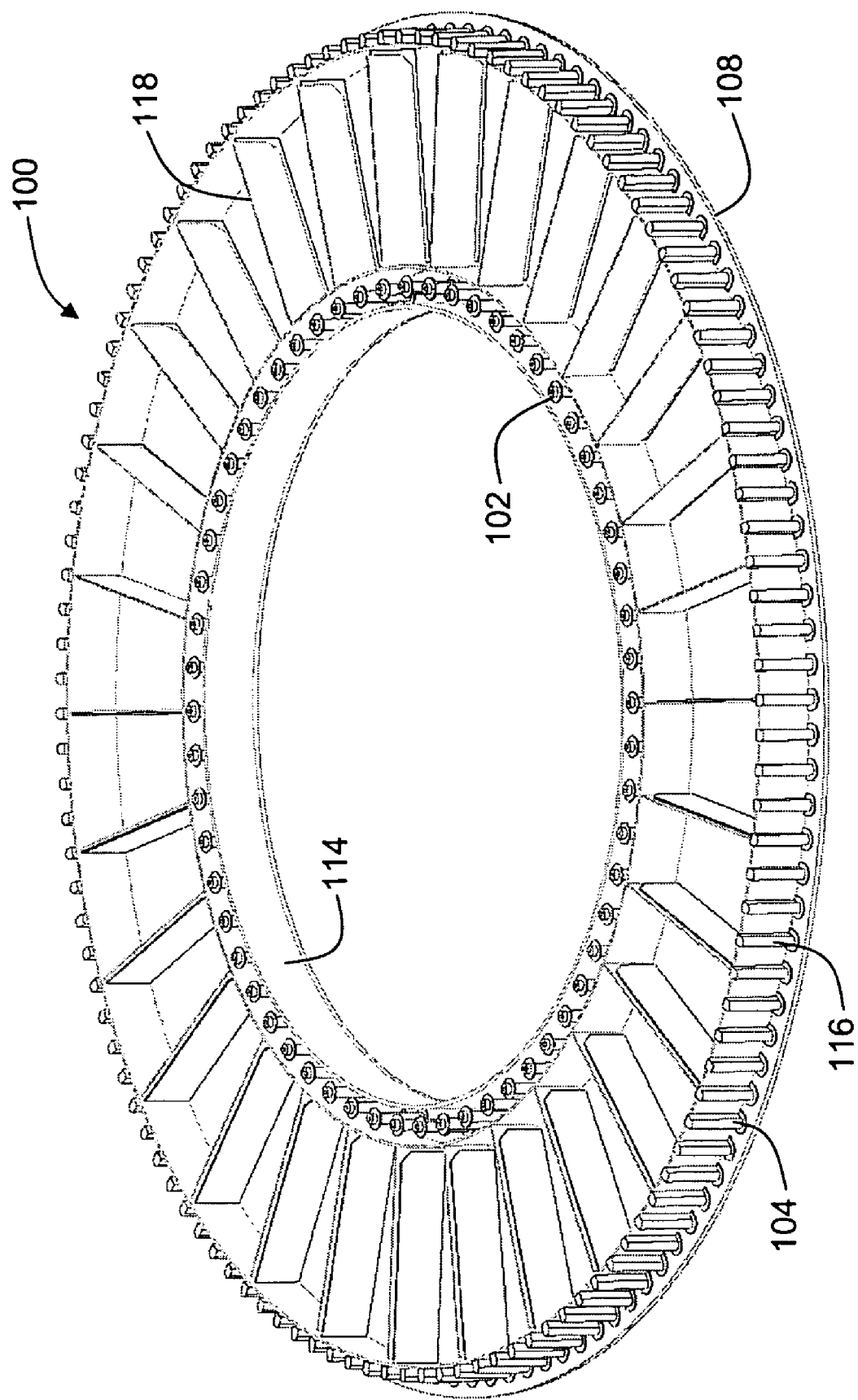
FIGS. 3a through 3d are perspective views of various embodiments of the payload adapter, each with the top sheet removed.
Figure 9:
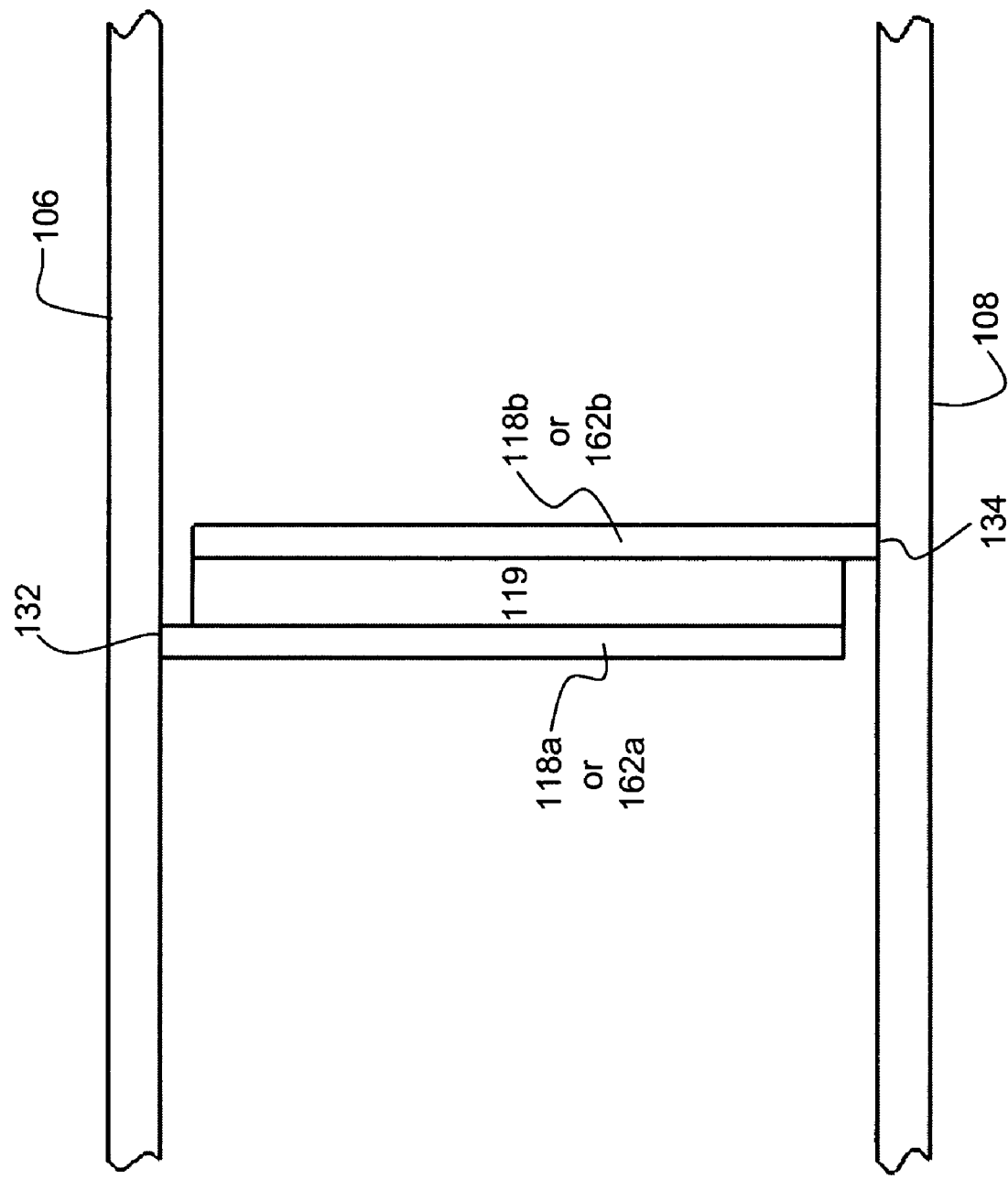
FIG. 9 shows one embodiment of the radial or circumferential ribs.

Referring now to FIG. 3a, the first face sheet 106 is removed to view the internal structure of the payload adapter 100. In this embodiment the first face sheet 106 and the second face sheet 108 are separated by a plurality of radial ribs 118, and by the inner 114 and outer 116 closure rings. The radial ribs 118 may be equally spaced, as shown, or may be spaced at irregular intervals depending on the design. In other embodiments, the radial ribs 118 may be pairs of rib elements located in close proximity to each other, with one of the rib elements in each pair attached to the top sheet 106 and the other rib element in the pair attached to the bottom sheet 108. A constrained layer damping material may be positioned between the two rib elements for enhancing the damping in both bounce and pitching modes of vibration, discussed below (see FIG. 9). The distance between the pairs of rib elements may also be varied depending on the design.

Figure 3B:
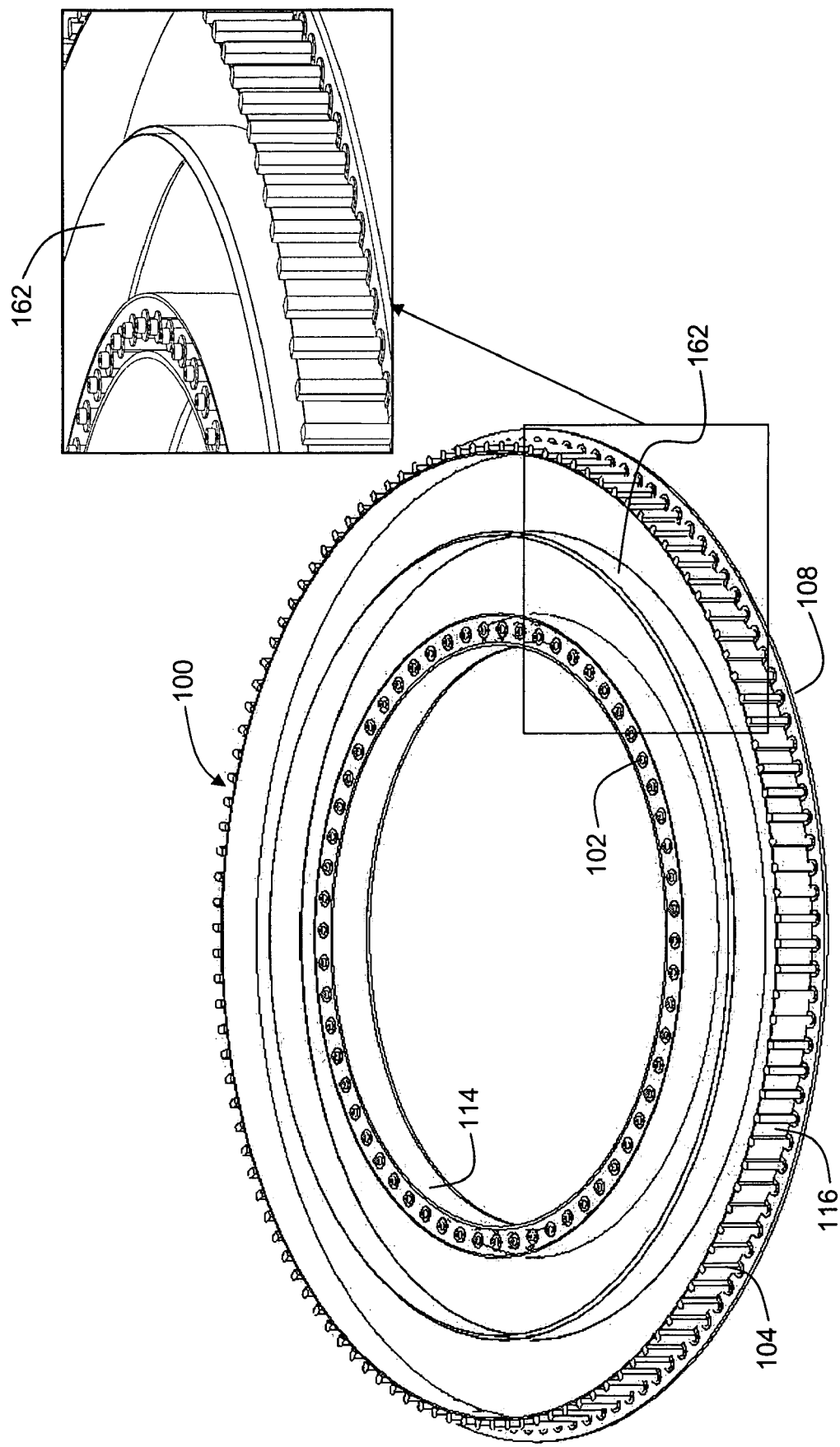

An alternative method of tying the two face sheets together is through the use of circumferential stiffeners 162 (FIG. 3b). The stiffener configuration shown in FIG. 9 would also be applicable in this case.

Figure 3C:
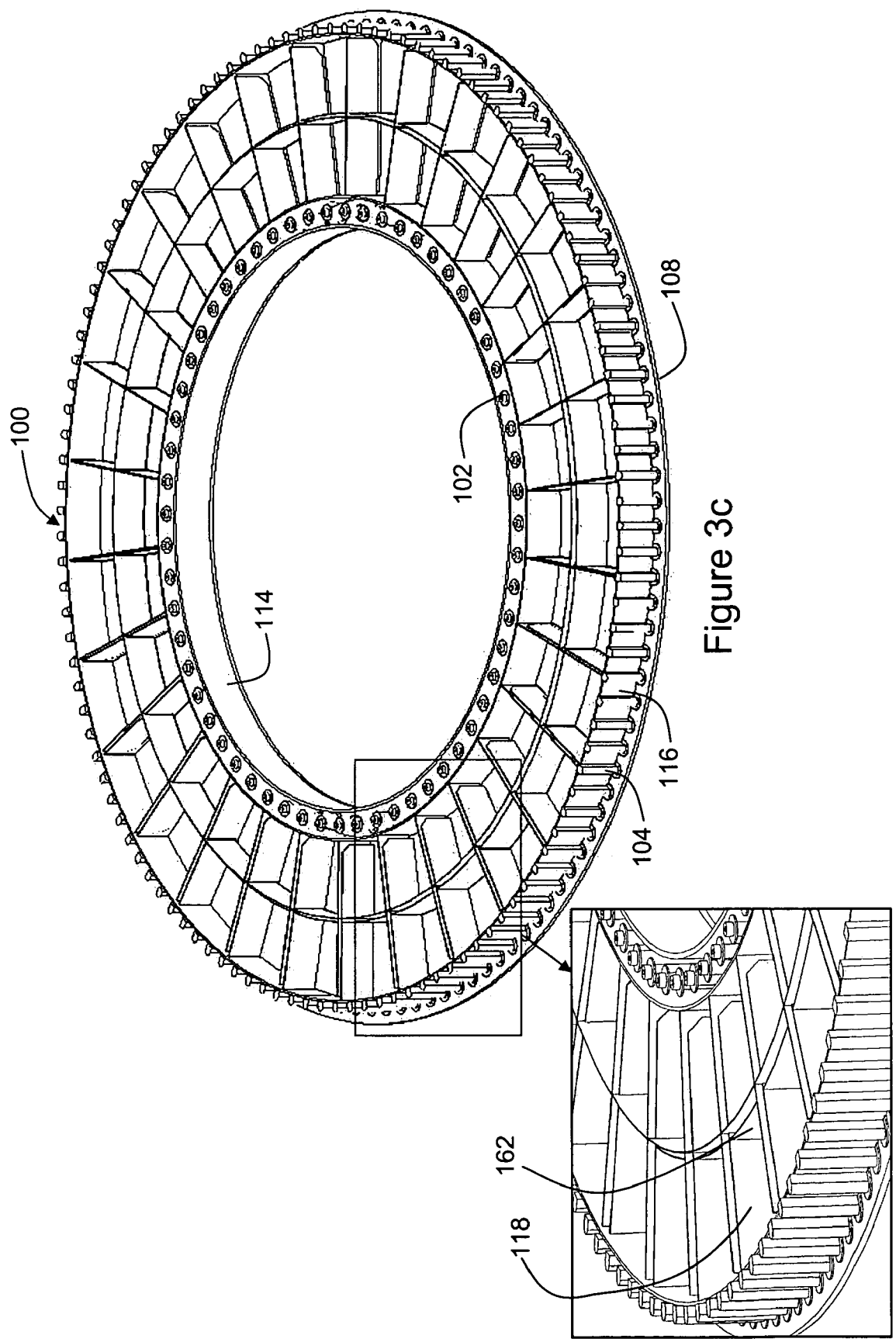

A combination of radial 118 and circumferential 162 ribs (FIG. 3c) is an embodiment of the proposed concept that can provide a preferred ratio of pitch to bounce natural frequencies.

Figure 3D:
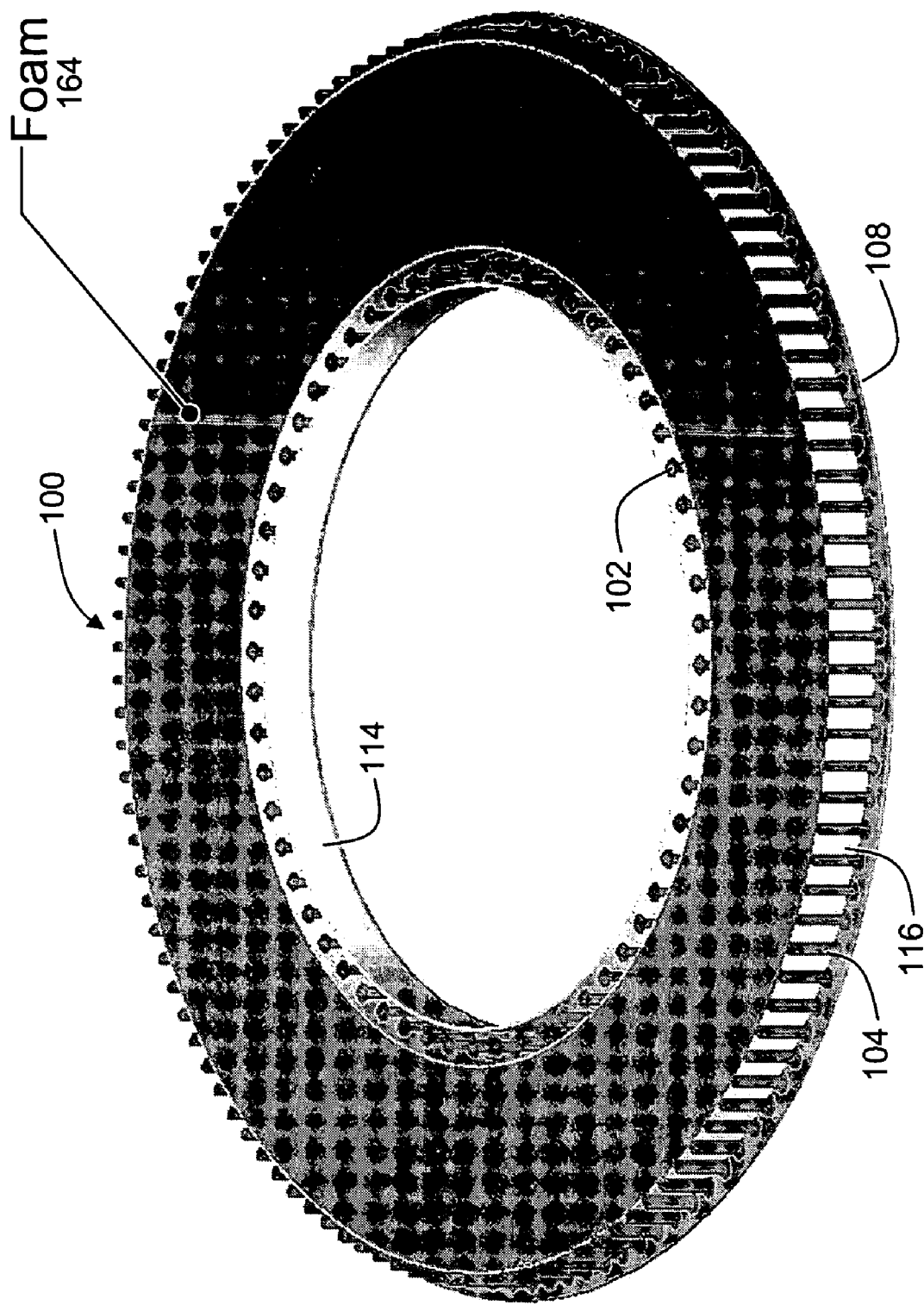
Figure 11:
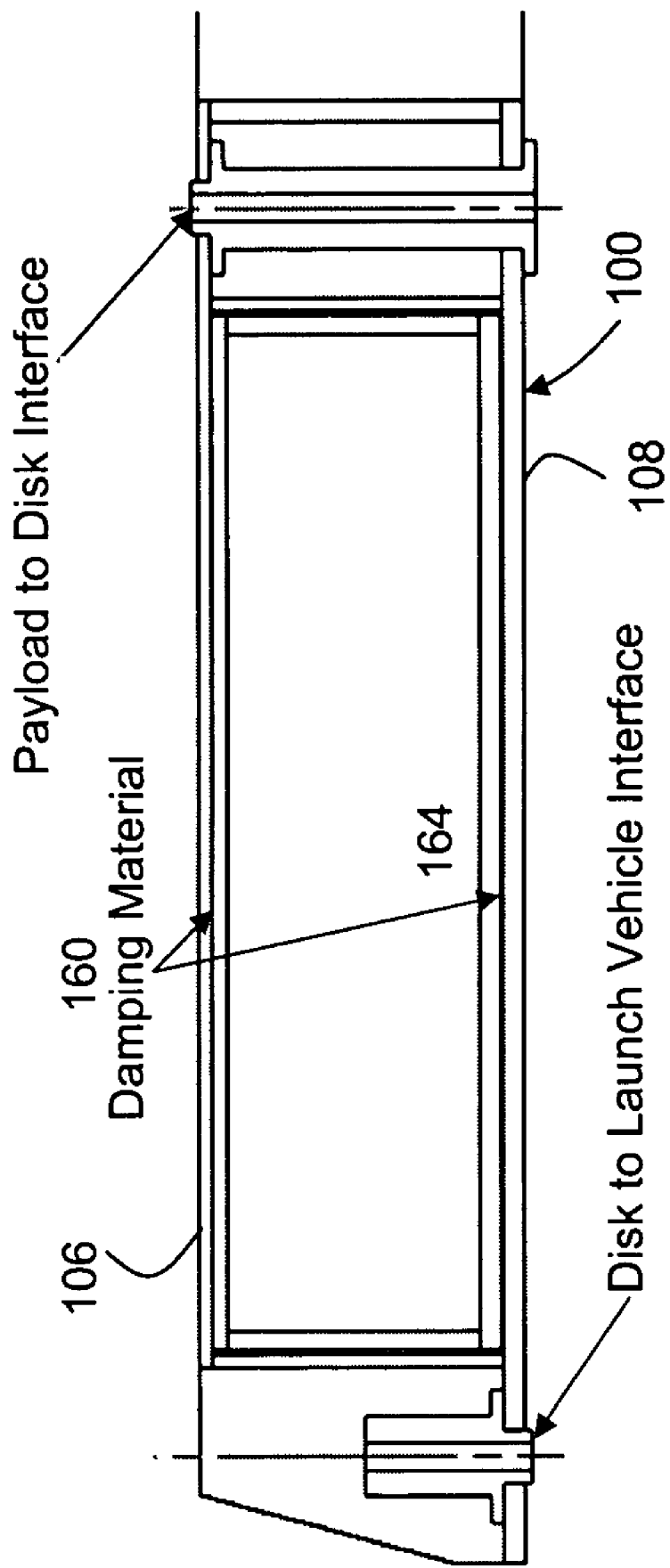
FIG. 11 is a sectional view showing one embodiment of a payload adapter with damping material.

In other embodiments the payload adapter hollow cavity may contain another annular disk comprised of face sheets and ribs and/or core material 164. FIGS. 3d and 11 show another embodiment using a damping material 160 having constrained layer damping on the entire top and bottom surfaces. Although this embodiment may appear significantly different than the radial rib embodiment of FIG. 3a, the desired outcome is the same—achieve vibration isolation by maintaining a low ratio of axial frequency to pitch frequency.

The ratio of axial frequency to pitch frequency is dependent on some geometric parameters. It has been noted that for a ratio of height of center of gravity (h) to the diameter of the mounting bolt circle (D) of one, a frequency ratio of less than three is a reasonable design target. If the (h/D) ratio is equal to 1.5, a frequency ratio of less than four becomes difficult to achieve with traditional flat-plate type designs. Similarly, for very low payloads with an (h/D) value of 0.75, a frequency ratio of approximately two is easily achievable. The present development provides a method for achieving lower frequency ratios for a wide range of geometric configurations.

The material selection of the various components allows the designer to vary the frequency characteristics of the payload adapter 100. For example, for an h/D ratio of one the use of isotropic materials for the top and bottom sheets would lead to a payload adapter 100 that has a ratio of axial frequency to lateral (pitch) frequency of more than three. In other words, this device would not be effective at isolating vibrations for excitation frequencies of 50-60 Hz unless the pitch mode was at a prohibitively low frequency. The payload adapter 100 preferably uses anisotropic materials to reduce the ratio of axial frequency to lateral (pitch) frequency to less than three. The desired effect of moving the axial and pitch frequencies closer together is achieved by the use of highly directional material properties. In one embodiment, the axial frequency is equal to or less than 45 Hz and the lateral (pitch) frequency is equal to or more than 15 Hz. In another embodiment, the axial frequency is equal to or less than 60 Hz and the lateral (pitch) frequency is equal to or more than 20 Hz. This directionality is an integral characteristic of the composite materials employed in payload adapter 100, and the use of such materials is important to the design of payload adapter 100. The term "anisotropic material" is used for material having mechanical properties that are not the same in all directions at a point in a body of the material. That is, the properties are a function of the orientation at a point.

Figure 4:
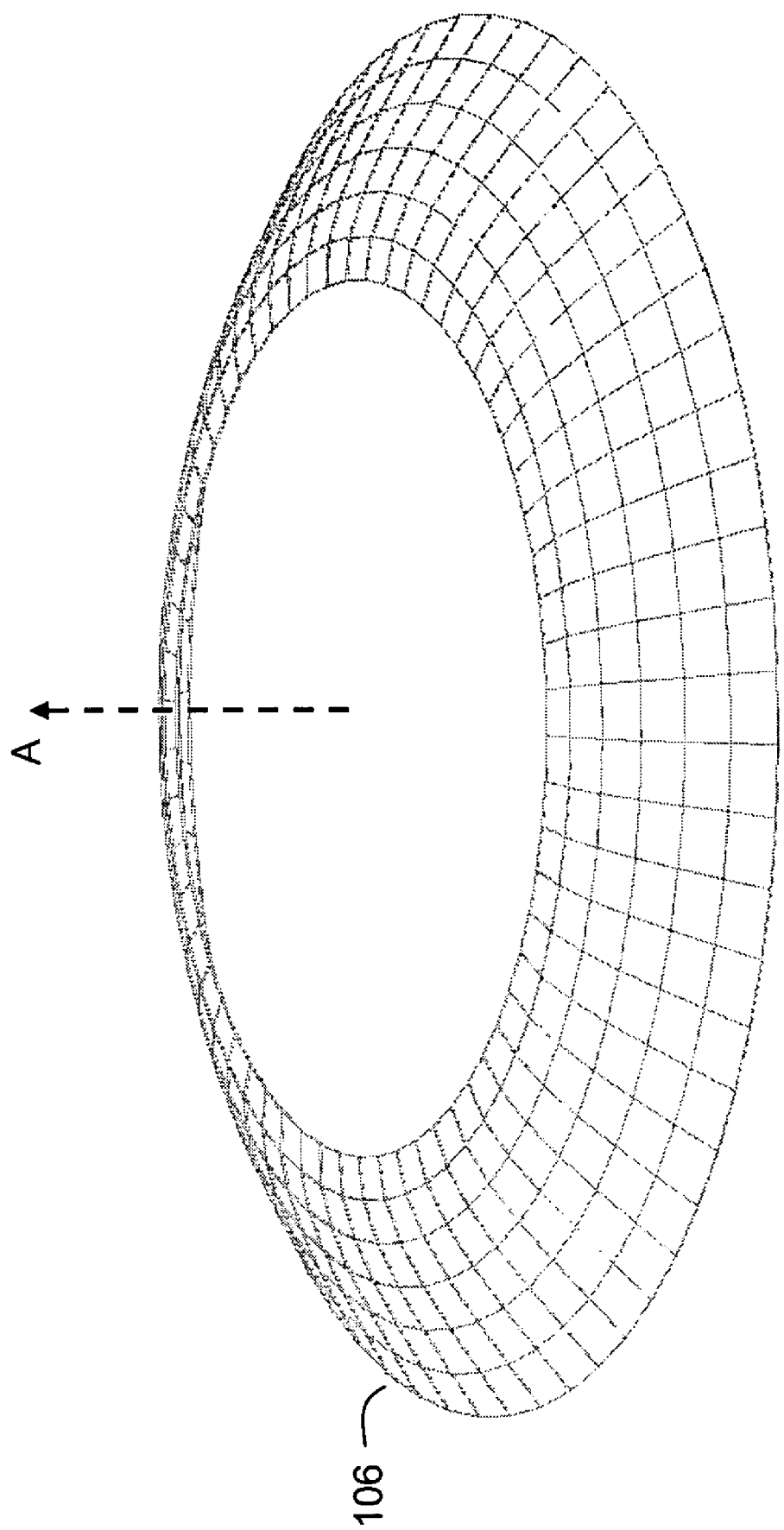
FIG. 4 is a representation of the deformation of the top sheet in an axial mode of vibration.
Figures 5A, 5B:
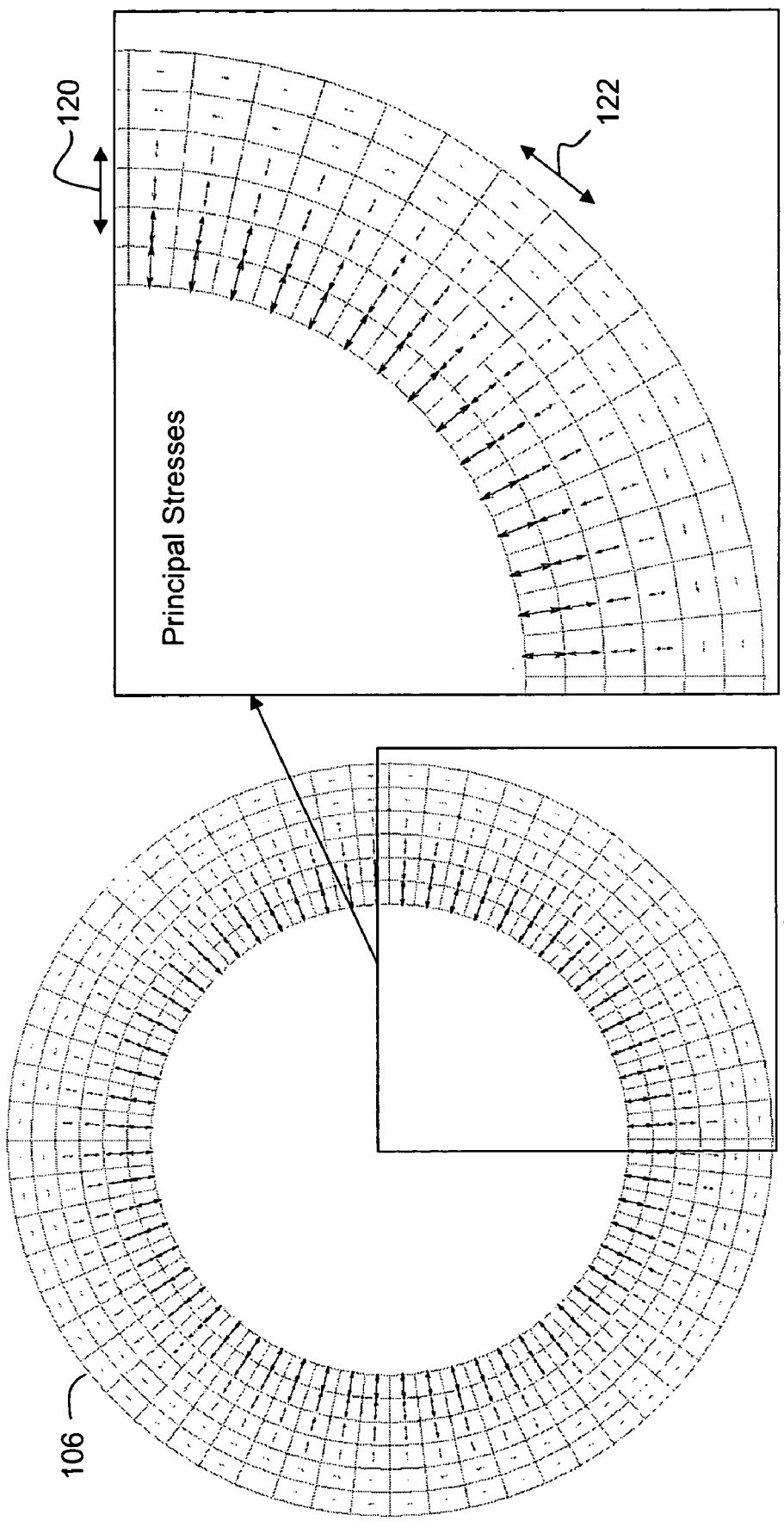
FIGS. 5a and 5b are directional representations of the stresses in the top sheet for the axial mode of vibration.

The relative change in stiffness that is sought for payload adapter 100 is the softening of the axial (bounce) stiffness and the stiffening of the pitch stiffness relative to an isotropic material version of the design. This is done by the use of highly directional composite fiber laminates. The use of composite face-sheets where the fibers are concentrated in directions of approximately +/−45° relative to radial lines will lead to very low material stiffness in the radial and hoop directions. FIG. 4 shows a schematic of the top sheet 106 subjected to axial load A. The principal strain directions for a pure axial mode of the payload adapter are shown in FIGS. 5a and 5b and are either radial 120 or tangential 122. Composite fibers 150 oriented at +45° 150a and −45° 150b to radial or hoop lines 152 (see FIG. 6) will add virtually no contribution to the stiffnesses in the principal stress directions. Consequently, the resulting added stiffness in the axial direction will be small. Types of composite materials may include graphite-epoxy composites, likely provided in the pre-preg condition or possibly filament wound during construction. Ply layer thicknesses of ~0.01 in are anticipated with final sheet lay-ups of 0.06 in to greater than 0.25 in.

Figure 12:
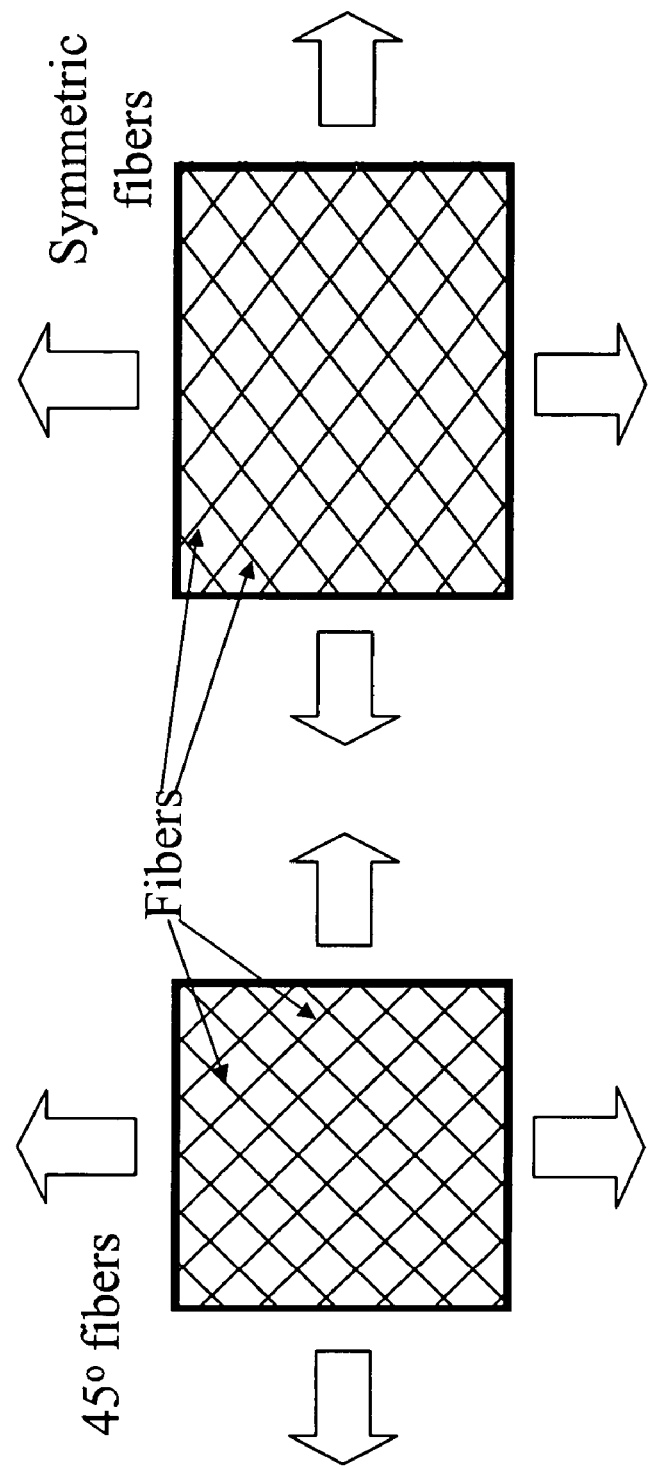
FIG. 12 shows fiber patterns with arrows that indicate the directions for which there is no stiffness contributed by the fibers shown, either for +/−45° (left) or other symmetric fibers (right).

The use of fibers at angles of +/−45° has been emphasized but it is important to note that other angles are feasible. Fibers oriented at +/−45° can be achieved by using 0/90° cloth which is widely used in the composites industry. The important structural consideration is that the fibers be oriented symmetrically with respect to both horizontal and vertical axes as shown in FIG. 12. This insures that the stiffnesses for direct strains in those directions are low but the stiffness with respect to shear strain is maintained. An angle θ could be used herein to denote the general orientation of the fibers but the +/−45° designation will be maintained because of its preponderance in manufacturing. Reasonable range for θ is 30-60°.

Figure 6:
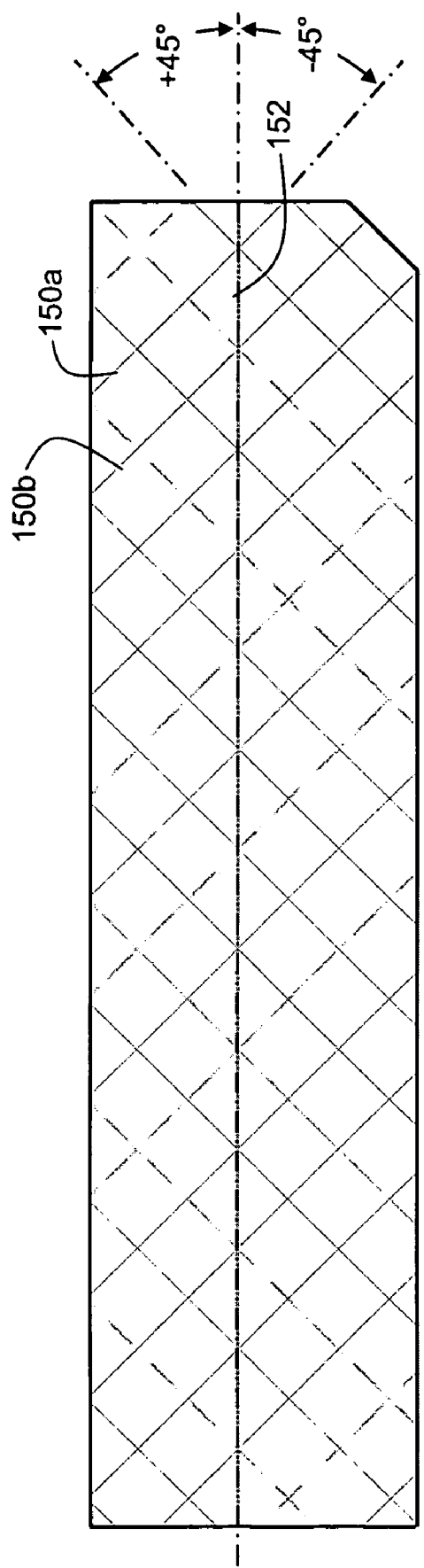
FIG. 6 is a schematic representation of material orientation relative to a radial line.

Composite fibers oriented 150 at +/−45° to radial lines 152 produce significant stiffness for the pitch mode of deformation (see FIG. 6). This can be best understood by reviewing principal stress directions in a face-sheet for the pitch mode of deformation. FIGS. 7a-7c show the direction of payload motion in pitching mode 124 and the stress in the face sheet 106. It can be seen that the principal strains 126 are at +/−45° to nodal lines 128 that remain straight during plate bending in this mode. The nodal lines 128 are also radial lines and, as discussed above, the composite fibers are also oriented 150 at +/−45° to radial lines 152. Thus, the +/−45° composite fibers located along to the nodal lines 128 provide significant stiffness in this mode.

Figure 8:
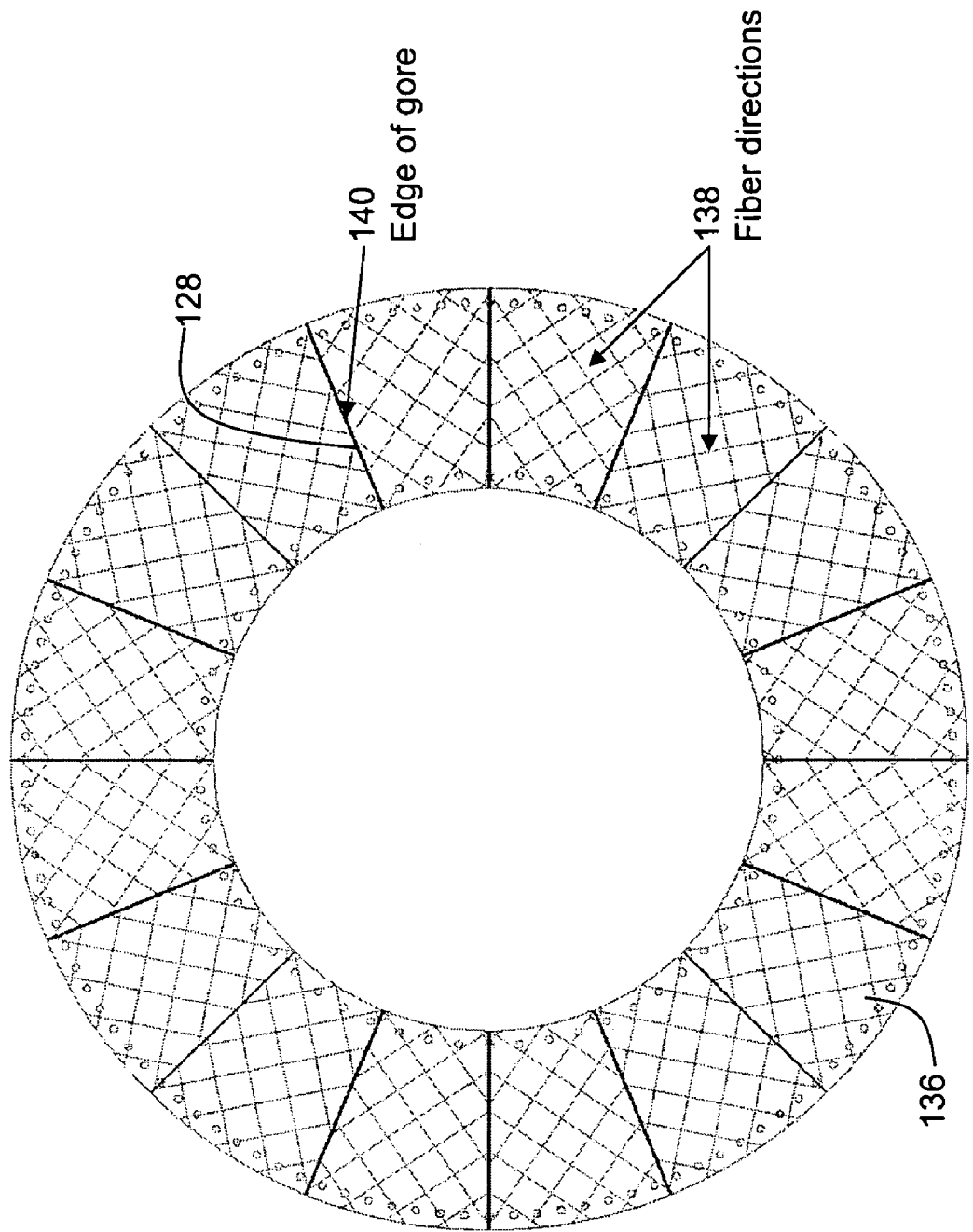
FIG. 8 is a plan view showing one embodiment of ply lay-up for the sheet.

This discussion has shown that the use of an anisotropic material with highly directional material properties produces very little stiffness in the axial mode of vibration while providing significant stiffness in the pitch mode. In one embodiment, the anisotropic material is a composite material with fibers oriented at +/−45° to radial lines. The realization of the +/−45° orientation consistently for all radial lines requires special attention. The reason for this is that the fibers used in composite construction are most readily available in cloth form with an orthogonal weave. One method of sheet construction (shown in FIG. 8) assembles a number of gores 136 into an annular-shaped single-ply. The woven composite material is cut into gores 136, the gores 136 being sized such that the fiber orientation or direction 138 is approximately +/−45° to the radial lines 128. The edge 140 of adjacent gores 136 are butted together along the radial line 128. Multiple ply layers of the composite material are then stacked to the appropriate thickness and cured. In other embodiments, the sheet layers may be constructed of unidirectional composite tape, with a first layer orientated approximately +45° to the radial lines 128, then a second layer orientated approximately −45° to the radial lines 128, and so on. In other embodiments, a combination of woven material and unidirectional tape material may be used, or filament winding may be applied. A large number of plies are used to form the laminate with care being taken to insure that the gore boundaries 140 do not coincide between adjacent plies.

Figure 13:
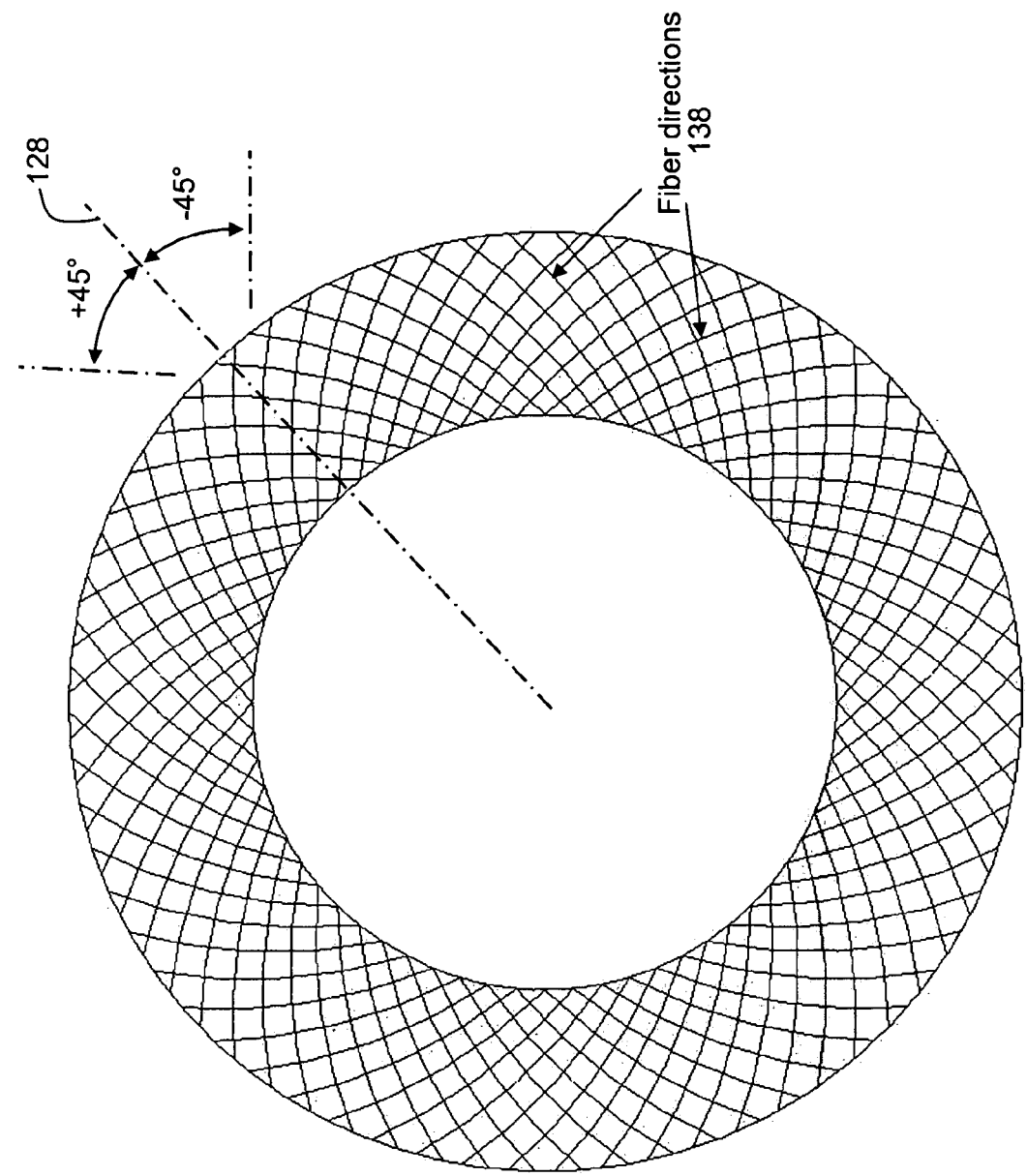
FIG. 13 is a plan view similar to FIG. 8 showing an alternate embodiment of construction using a woven cloth for a typical ply in the sheet.

An alternate embodiment achieves directional stiffness properties by using a customized cloth weave. It is possible to orient the fibers in such a cloth to have the correct orientation at all radial locations. Such a weave is shown in FIG. 13.

The radial ribs 118 are apparent in the embodiment shown in FIG. 3 and their role in the payload adapter 100 is explained with reference to the axial and pitch modes of deformation given in FIGS. 4, 5 and 7. It is again noted that the use of isotropic properties for these ribs would lead to significant stiffness in both modes of vibration. This is not a desirable outcome since decreasing bounce stiffness more than pitch stiffness is a goal of the design.

The radial ribs 118 may also be made from anisotropic materials, such as composite materials, with fibers oriented at +/−45° to the long rib edges or radial lines. Radial ribs 118 configured this way will have virtually no stiffness for the bounce mode of vibration. The top and bottom edges of the radial ribs 118 will be able to extend or compress without straining the inclined fibers in this mode of deformation. Material types may include composites with carbon or aramid fibers. Plies of woven roving fabric pre-impregnated with resin may be used. Ply layer thicknesses of ~0.01 in are anticipated with final rib lay-ups of 0.04 in to approximately 0.12 in.

The radial ribs 118 on either side of the nodal lines 130 in the pitch modes of vibration (see FIGS. 7a-7c) will be subject to vertical shear deformation for which the +/−45° fibers will contribute significant stiffness. Another way to interpret this is to imagine the top sheet 106, the bottom sheet 108 and radial ribs 118 making a series of imaginary radial box beams connecting the inner closure ring 114 and outer closure ring 116. These box beams will have very little bending stiffness but will be quite stiff in torsion. Bending is the only mode present in the beams in the bounce mode of vibration. The pitch mode will put some of the radial box beams in torsion hence providing some stiffness while the beams at right angles to the nodal lines will be in bending and provide no stiffness. However the net result is that pitch stiffness is achieved without a corresponding increase in bounce stiffness.

The beneficial effect of damping has already been noted and this effect is utilized in the present device. In another embodiment shown in FIG. 9, the radial ribs 118 may be pairs of rib elements 118a, 118b located in close proximity to each other. One of the rib elements 118a in each pair being attached to the top sheet 106 at a location 132, and the other rib element 118b being attached to the bottom sheet 108 at a location 134. A damping material 119 may be positioned between the pair of rib elements 118a, 118b for enhancing the damping in both bounce and pitch modes of vibration. There is a tendency for the adjacent ribs to shear relative to each other in either mode. There is no corresponding tendency to separate the two rib elements in these same modes. Thus, the damping material, despite having weak tensile strength, is unlikely to fail in tension. The damping material may be a visco-elastic material or other type of material that exhibits a high degree of energy dissipation when subject to vibratory strains. The damping material would generally be bonded to the bounding ribs through its own adhesive properties or by the use of an additional adhesive. There is a trade-off between the thickness of the damping material and the associated material stiffness and damping properties. In the extreme case where the damping material is very stiff and is included as a thin layer, very little strain energy is present in the damping layer and hence there is minimal potential to dissipate energy. For a very thick layer of flexible damping material there is again the possibility of very low shear stiffness during vibrations. This again leads to low energy dissipation. Optimized conditions of intermediate thickness and stiffness exist where the damping properties are maximized. Similarly, there is an optimal damping treatment trade-off for the disk embodiment shown in FIG. 11.

In summary, the payload adapter described herein has the capability of allowing independent tuning of the pitch and bounce modes of vibration. Certain material and geometric parameters can be selected to move the modes to desirable natural frequency combinations. This can lead to superior complete payload isolation without compromising the rocket dynamic performance vis-à-vis stability and control issues. The characteristics of the payload adapter are achieved without deviating from relatively standard composite material and construction technology. Furthermore, the concept can lead to a durable, strong and lightweight hardware manifestation.

While certain embodiments are illustrated in the drawings and are described herein, it will be apparent to those skilled in the art that the specific embodiments described herein may be modified without departing from the inventive concepts described. Accordingly, the invention as described herein is not to be restricted, except in accordance with the law by the claims which follow.

What is claimed is:

1. A payload adapter, comprising:
    an annular hollow body having a first side and a second side opposite the first side and having a first closure ring and a second closure ring surrounding the first closure ring;
    a first annular face sheet covering the first side;
    a second annular face sheet covering the second side; and a plurality of radial stiffening members located inside the annular hollow body, wherein each of the radial stiffening members connects the first annular face sheet to the second annular face sheet; the annular hollow body and the plurality of radial stiffening members in combination resulting in an axial frequency to lateral frequency ratio of less than three for the loaded payload adapter.

2. The payload adapter of claim 1, wherein the axial frequency is less than 45 Hz and the lateral frequency is more than 15 Hz.

3. The payload adapter of claims 1, wherein the axial frequency is less than 60 Hz and the lateral frequency is more than 20 Hz.

4. The payload adapter of claim 1, wherein the first annular face sheet is a composite laminate comprising one or more plies of a composite material.

5. The payload adapter of claim 4, wherein the composite material is selected from the group consisting of graphite, aramid, fiberglass and combinations thereof.

6. The payload adapter of claim 5, wherein the composite material includes directional fibers oriented at +/−θ degrees relative to radial lines of the annular hollow body, wherein θ is between 30 and 60 degrees.

7. The payload adapter of claim 1, wherein the second annular face sheet is a composite laminate comprising one or more plies of a composite material.

8. The payload adapter of claim 7, wherein the composite material is selected from the group consisting of graphite, aramid, fiberglass and combinations thereof 9. The payload adapter of claim 8, wherein the composite material includes directional fibers oriented at +/−θ degrees relative to radial lines of the annular hollow body, wherein θ is between 30 and 60 degrees.

10. The payload adapter of claim 1, wherein the radial stiffening members are made of a composite laminate comprising one or more plies of a composite material.

11. The payload adapter of claim 10, wherein the composite material is selected from the group consisting of graphite, aramid, fiberglass and combinations thereof.

12. The payload adapter of claim 11, wherein the composite material includes fibers oriented at +/−θ degrees relative to the length of the radial stiffening members, wherein θ is between 30 and 60 degrees.

13. The payload adapter of claim 1, wherein each of the radial stiffening members comprises a pair of rib elements located in close proximity to each other.

14. The payload adapter of claim 13, wherein a first rib element in each pair is attached to the first annular face sheet and a second rib element in each pair is attached to the second annular face sheet.

15. The payload adapter of claim 14, further comprising damping material located between the pair of rib elements of at least one of the radial stiffening members.

16. The payload adapter of claim 15, wherein the damping material is a visco-elastic material.

17. A payload adapter, comprising:
an annular body having a hollow interior, a first side, and a second side opposite the first side;
a first annular face sheet covering the first side of the annular body, the first annular face sheet being formed from an anisotropic material;
a second annular face sheet covering the second side of the annular body, the second annular face sheet being formed from an anisotropic material; and
a plurality of radial stiffening members located inside the annular body; wherein
each of the radial stiffening members connects the first annular face sheet to the second annular face sheet; the annular hollow body and the plurality of radial stiffening members in combination resulting in an axial frequency to lateral frequency ratio of less than three for the payload adapter, and the annular hollow body further comprising:
an inner closure ring connecting the first annular face sheet to the second annular face sheet near an inner diameter of the annular hollow body; and
an outer closure ring connecting the first annular face sheet to the second annular face sheet near an outer diameter of the annular hollow body.

18. The payload adapter of claim 17, wherein the first and second annular face sheets have stiffening properties oriented at +/−θ degrees relative to the annular body, wherein θ is between 30 and 60 degrees.

19. The payload adapter of claim 17, wherein the first and second annular face sheets are made of a composite material having directional fibers oriented at +/−θ degrees relative to the annular body, wherein θ is between 30 and 60 degrees.

20. The payload adapter of claim 17, wherein each of the radial stiffening members comprises a pair of rib elements located in close proximity to each other.

21. The payload adapter of claim 20, wherein a first rib element in each pair is attached to the first annular face sheet and a second rib element in each pair is attached to the second annular face sheet.

22. The payload adapter of claim 21, further comprising damping material located between the pair of rib elements of at least one of the radial stiffening members.

23. A payload adapter, comprising:
an annular body having a hollow interior, a first side, and a second side opposite the first side;
a first annular face sheet covering the first side of the annular body, the first annular face sheet being formed from an anisotropic material;
a second annular face sheet covering the second side of the annular body, the second annular face sheet being formed from an anisotropic material; and
a plurality of radial stiffening members located inside the annular body; wherein
each of the radial stiffening members connects the first annular face sheet to the second annular face sheet; wherein the annular hollow body and the plurality of radial stiffening members in combination result in an axial frequency to lateral frequency ratio dependent on a ratio of height of center of gravity (h) to a mounting bolt circle diameter (D) for the loaded payload adapter.

24. The payload adapter of claim 23, wherein for a ratio of h/D of 0.75, the frequency ratio is less than 2.

25. The payload adapter of claim 23, wherein for a ratio of h/D of 1, the frequency ratio is less than 3.

26. The payload adapter of claim 23, wherein for a ratio of h/D of 1.5, the frequency ratio is less than 4.

27. The payload adapter of claim 17, further comprising a plurality of inner bolts in a first pattern, wherein the first pattern matches a payload anchor-bolt pattern.

28. The payload adapter of claim 17, further comprising a plurality of outer bolts in a second pattern, wherein the second pattern matches a launch vehicle anchor-bolt pattern.

29. A payload adapter, comprising:
an annular hollow body having a first side, a second side opposite the first side, an inner diameter, and an outer diameter;
a first annular face sheet covering the first side;
a second annular face sheet covering the second side;

a plurality of radial stiffening members located inside the annular hollow body, wherein each of the radial stiffening members connects the first annular face sheet to the second annular face sheet; and a plurality of outer bolts in a circular pattern having a diameter (D) of a mounting bolt circle, wherein the circular pattern matches a launch vehicle anchor-bolt pattern; wherein the annular hollow body and the plurality of radial stiffening members in combination result in an axial frequency to lateral frequency ratio dependent on a ratio of height (h) of center of gravity to the diameter (D) for the loaded payload adapter.

30. The payload adapter of claim 29, wherein each of the radial stiffening members is a radial rib.

31. The payload adapter of claim 29, further comprising a plurality of inner bolts in a first pattern, wherein the first pattern matches a payload anchor-bolt pattern.

32. The payload adapter of claim 29, wherein for a ratio of h/D of 0.75, the frequency ratio is less than 2.

33. The payload adapter of claim 29, wherein for a ratio of h/D of 1, the frequency ratio is less than 3.

34. The payload adapter of claim 29, wherein for a ratio of h/D of 1.5, the frequency ratio is less than 4.

35. The payload adapter of claim 29, wherein the annular hollow body further comprises:

an inner closure ring proximate the inner diameter between the first annular face sheet and the second annular face sheet; and an outer closure ring proximate the outer diameter between the first annular face sheet and the second annular face sheet.

36. The payload adapter of claim 35, wherein the inner and outer closure rings are made of metal.

37. The payload adapter of claim 1, wherein the inner and outer closure rings are made of composite material.

* * * * *